Figures 1, 4:
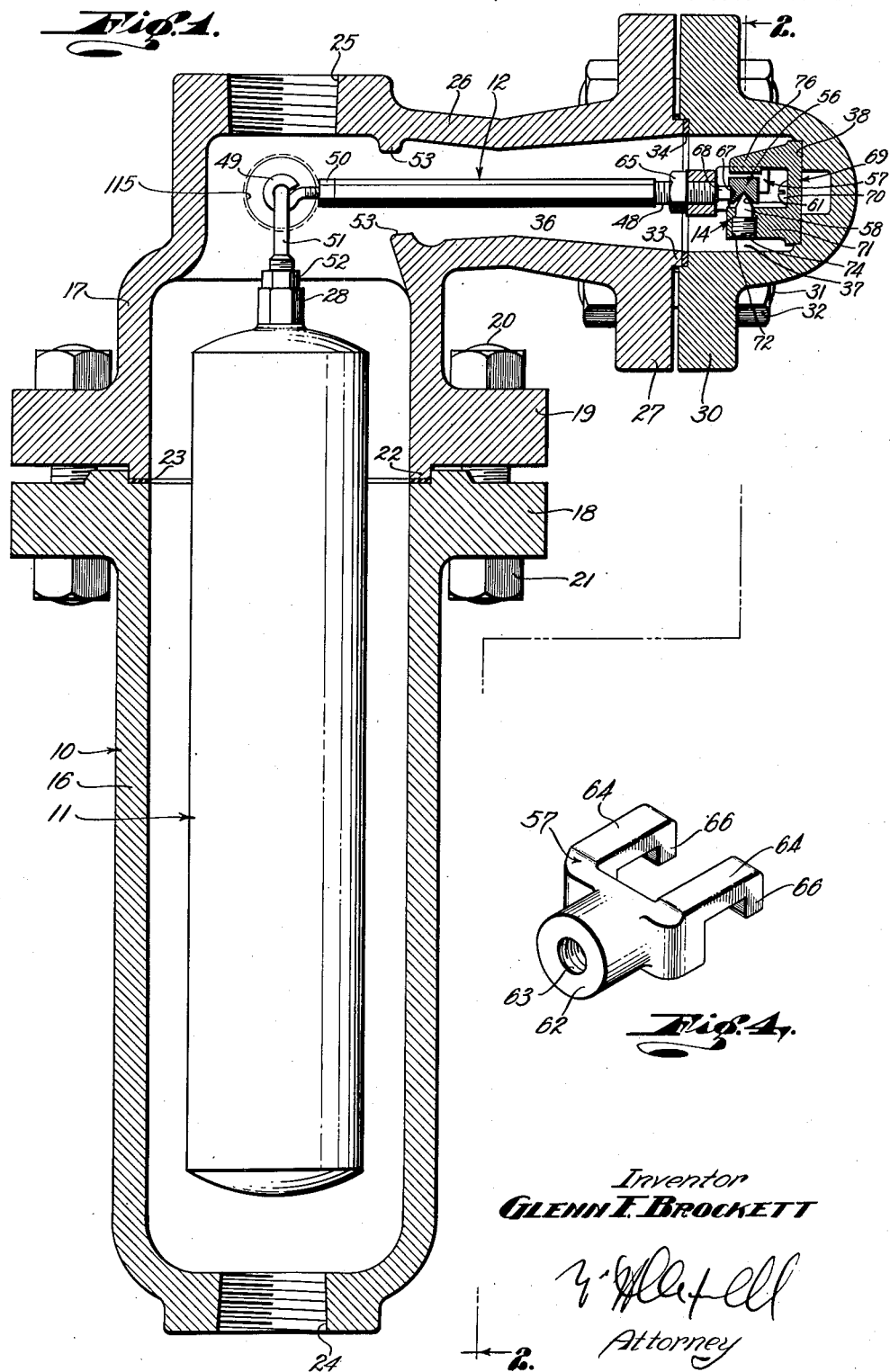

July 18, 1944. G. F. BROCKETT 2,353,641
LIQUID LEVEL RESPONSIVE MEANS
Filed Feb. 9, 1942 2 Sheets-Sheet 1

Inventor
GLENN F. BROCKETT
Attorney

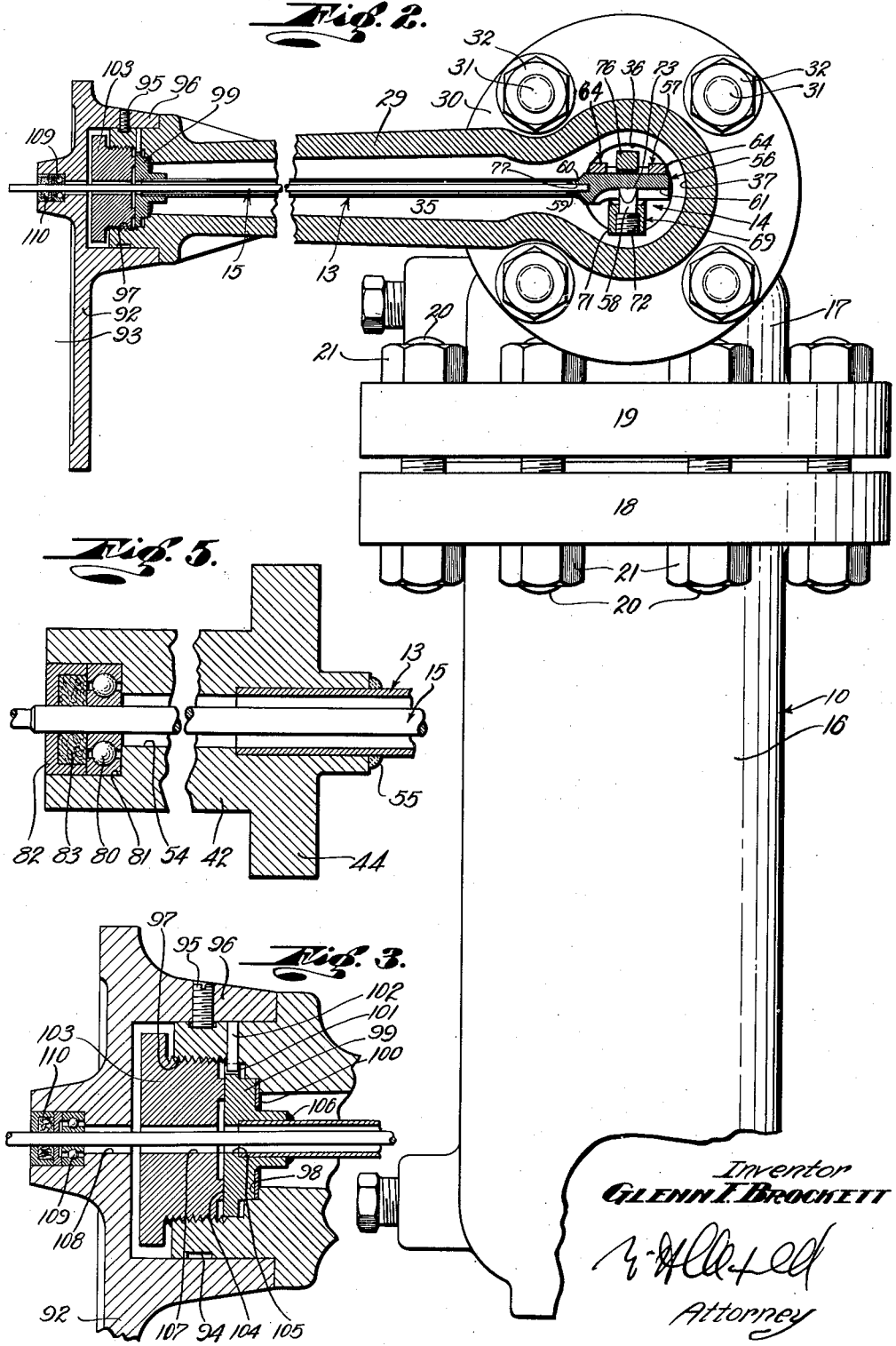

Patented July 18, 1944

2,353,641

UNITED STATES PATENT OFFICE 2,353,641

LIQUID LEVEL RESPONSIVE MEANS

Glenn F. Brockett, Marshalltown, Iowa, assignor to Fisher Governor Company, Marshalltown, Iowa, a corporation of Iowa Application February 9, 1942, Serial No. 430,161

3 Claims. (Cl. 137—104)

This invention relates to float controls, etc. and relates more particularly to a liquid level responsive means and specific gravity responsive means for operating control valves, indicating devices, and the like. A general object of this invention is to provide a liquid level responsive or specific gravity responsive means which is highly efficient and which is simple, practical and durable.

Another object of this invention is to provide a liquid level responsive means or specific gravity responsive means characterized by a motion transmitting means for transmitting motion from within the float chamber structure to the exterior of said structure for the operation of an indicator, valve, or the like, which means eliminates all possibility of leakage and eliminates the necessity for packing glands, bearings, etc. which would create frictional resistance to the movement. The device of the present invention embodies what may be termed a torque tube means for the transmission of movement through the wall of the float cage from the float actuated part to the valve part or indicator at the exterior of the housing. This torque tube means includes a flexible resilient tube secured to the wall of the housing or float cage to communicate with an opening therein and having its inner end operatively connected with the float lever to be turned thereby and a shaft secured to the inner end of the torque tube and passing freely through said tube and opening to the exterior of the cage for the operation of the valve, indicator, or other operated device.

Another object of this invention is to provide a device of the character referred to embodying a novel and highly effective substantially frictionless bearing means for supporting the inner end of the torque tube. The torque tube above referred to must, for the most effective operation, be yielding to the extent that minor movements of the float are reflected in movement of the shaft extending to the exterior of the cage. The yielding tube is inadequate or incapable of supporting the float rod and other parts and of resisting vertical distortion resulting from float movement and it is necessary to provide bearing means for the free end of the torque tube. The present invention embodies a simple practical and highly effective knife edge bearing which dependably supports the free end of the torque tube with a minimum of friction.

Another object of this invention is to provide a device of the character mentioned in which the entire internal mechanism, with the exception of the float, may be removed and made accessible by simply disconnecting a simple flanged connection between sections of the housing.

A further object of this invention is to provide a device of the character mentioned in which the housing and general construction is compact, simple and inexpensive.

The various objects and features of my invention will be fully understood from the following detailed description of a typical preferred form and application of my invention, throughout which description reference is made to the accompanying drawings, in which:

Fig. 1 is a vertical detailed sectional view of the device. Fig. 2 is a vertical detailed sectional view taken substantially as indicated by line 2—2 on Fig. 1 with the body of the float cage in elevation. Fig. 3 is an enlarged fragmentary detailed sectional view illustrating the outer portion of the cage arm, illustrating the means for anchoring the torque tube and the outboard bearing means for the shaft. Fig. 4 is an enlarged perspective view of the clamp part of the bearing means and Fig. 5 is a fragmentary sectional view illustrating an alternative construction.

The liquid level responsive or specific gravity responsive device of the present invention may be said to comprise, generally, a float housing or cage 10 adapted to have communication with a liquid container, a float 11 in the cage, a lever 12 suspending the float 11 and operated by the float, a torque tube 13 having one end fixed to a wall of the housing or cage 10 and having its other end operatively connected with the float lever 12, bearing means 14 for supporting the other end of the torque tube 13 and a rod or shaft 15 connected with the inner end of the torque tube 13 and extending therethrough to the exterior of the housing or cage 10 for connection with a control valve, pilot valve, indicating means, or other actuated device.

The housing or cage 10 may be varied in design and construction to adapt the device for given installations or given types of installations. In the drawings I have shown a preferred construction, it being understood that the invention is not to be construed as limited or restricted to the particular form of cage illustrated. The housing or cage 10 shown in the drawings comprises a body 16 having a top section 17. The cage body 16 is a vertically elongated hollow member provided at its upper end with a horizontal out-turned flange 18. The top section 17 is a hollow member having a flange 19 on its lower end complementary to the flange 18 of the body 16. Bolts or studs 20 are passed through openings in the flanges 18 and 19 and nuts 21 on the studs cooperate with the flanges 18 and 19 to connect the body 16 and top section 17. The body 16 and section 17 have telescoping parts 22 and a gasket 23 is engaged between the parts 22 to provide a fluid seal. Threaded openings 24 and 25 are provided in the lower end of the body 16 and the upper end of the section 17 to facilitate the connection of the body 10 in a line having communication with a tank or other container, not shown. Pipes leading from the openings 24 and 25 may be connected with a tank or other container to have communication with the interior thereof at vertically spaced points beyond the intended range of the float 11. The top section 17 has a lateral or horizontal branch 26, the section 17 being in the nature of an L. The branch 26 is tubular and is provided at its outer end with a vertically disposed external flange 27.

The housing or cage 10 further includes a lateral or horizontal arm 29 for carrying the torque tube 13. The arm 29 is an elongate tubular or hollow member secured to the outer end of the branch 26. The arm 29 extends at right angles to the branch 26 and is provided at its inner end with a vertical flange 30 for opposing the flange 27. Studs 31 are passed through openings in the flanges 27 and 30 and nuts 32 are threaded on the studs to connect the flanges. The branch 26 and arm 29 have telescoping parts 33 and a gasket 34 is provided at these parts to make a fluid tight seal between the arm and branch. The longitudinal opening 35 of the hollow arm 29 preferably has its longitudinal axis normal to the axis of the longitudinal opening 36 in the branch 26. A socket or opening 37 extends through the flange 30 at right angles to the opening 35 to communicate with and form a continuation of the opening 36 in the branch 26. A cylindrical counter bore 38 is provided in the bottom or outer wall of the opening 37 and is preferably in concentric relation to the longitudinal axis of the opening 36.

The outer end of the arm 29 is formed to mount a pilot mechanism, indicator, or the like, and to fixedly anchor and support the torque tube 13. In the construction of Figs. 2 and 3 the outer portion of the arm 29 is turned down to constitute a boss 90. This boss 90 enters a socket 91 on the supporting plate or housing plate 92 of the pilot mechanism 93. An annular groove 94 is provided in the exterior of the boss 90 and a set screw 95 is threaded through an opening in a hub or boss 96 on the plate 92 and engages in the groove 94. This construction permits relative rotary adjustment between the pilot mechanism plate 92 and the arm 29 and the screw 95 may be tightened to secure the pilot mechanism 93 in position. A socket 97 is provided in the outer end of the boss 90 and an outwardly facing shoulder 98 occurs at the bottom of the socket.

An anchor block or insert 99 is arranged in the socket to carry the torque tube 13. A gasket 100 is engaged between the shoulder 98 and the inner end of the insert 99 to provide a fluid tight seal. In accordance with the invention the block or insert 99 is fixed or locked against movement. A slot 101 is formed in the periphery of the insert 99 and a fixed drive pin 102 is carried in an opening in the boss 90 and cooperates with the slot 101 to positively secure the insert 99 against turning. A plug 103 is threaded in the socket 97 and has a ridge 104 on its inner end for bearing against the insert 99. The plug 103 is threaded in the socket 97 to tightly clamp the insert 99 against the gasket 100 and to secure the insert against axial movement. The insert 99 secured in the outer end of the arm 29, as just described, serves as a fixed anchor for the torque tube 12 as will later appear.

In the alternative structure of Fig. 5 a cylindrical fitting or insert 42 is provided to anchor the end of the torque tube. The anchor block 42 may be secured in the outer end of the arm 29 in much the same manner as the above described insert 99 and has a flange 44 adjacent its inner end to facilitate its attachment to the arm. In this construction the insert or block may be of substantial length to continue outwardly beyond the end of the arm 29. The insert 42 assists in carrying the torque tube 13 and the shaft 15, as will be later described.

The float 11 may be of any selected or required type and construction. In the case illustrated, the float 11 is an elongate cylindrical member received in the body 16 and section 17 with substantial clearance. A boss 28 is formed on the upper end of the float 11 to facilitate its connection with the lever 12, as will be later described. The hollow float 11 is weighted to always partially sink in the liquid and is arranged and designed to have the required range of movement in the housing or cage 10.

The float lever 12 extends through the opening 36 of the branch 26 and is connected with the upper end of the float 11 to suspend the float and to be operated or swung by the float. The lever 12 is a rigid or unyielding elongate member formed at its ends for connection with the float 11 and the bearing means 14. In the case illustrated the lever 12 is polygonal in transverse cross section and has a reduced threaded portion 48 on its inner end and an eye 49 on its outer end. The eye 49 may be threaded in an opening in the end of the lever 12 and may be secured in place by a lock nut 50. A similar eye 51 may be threaded in the boss 28 of the float 11 and may be locked in position by a nut 52. The eyes 46 and 51 engage one with the other to form a dependable pivotal connection between the float 11 and the lever 12. The branch 26 is proportioned so that its opening 36 allows ample swinging movement of the lever 12. Stops 53 may be formed on the upper and lower walls of the opening 36 to limit the swinging motion of the lever 12.

The torque tube 13 extends longitudinally through the opening 35 of the arm 29. In accordance with the invention the tube 13 is flexible and resilient to yield when subjected to turning forces or torque and to return to its original condition when such turning forces are removed. In practice, the tube 13 is a thin walled member formed of flexible resilient material. The outer end of the tube 13 is anchored or fixed. The block or insert 99 has a longitudinal opening 105 and the inner portion of this opening is counter bored to receive the end portion of the tube 13, as best illustrated in Fig. 3. The tube 13 may be permanently fixed to the insert 99 as by welding 106. The welding 106, in addition to securing the tube 13 to the insert 42, may operate to provide a fluid seal between the exterior of the tube and the insert 99. The tube 13 secured to the insert 99, as just described, in effect constitutes an integral continuation of the insert, having its interior in communication with the opening 105. The tube 13 is of substantial length and its inner end occurs adjacent the point of joinder of the openings 36 and 37.

The bearing means 14 is a feature of the invention. The bearing means 14 serves to support the inner end of the flexible torque tube 13 for turning or flexure about its longitudinal axis and further serves to connect the float lever 12 with the tube 13 whereby operation or swinging of the lever 12 turns or flexes the tube 13. The bearing means 14 may be said to include a part or member 56 on the inner end of the torque tube 13, a part 57 on the inner end of the float lever 12 cooperating with the member 56 to connect the lever and tube 13 and a bearing 58 mounted in the housing or cage 10 and cooperating with the member 56 to support the inner end of the torque tube 13 for free turning or flexure on its longitudinal axis.

The member 56 is an elongate flat sided member which may be rectangular or substantially square in transverse cross section as illustrated. A reduced cylindrical stem 59 is provided on the end of the member 56 to fit within the end of the torque tube 13. Welding 60 may fix the member 56 to the end of the tube 13. The welding may serve to provide a fluid tight seal between the member 56 and the end of the tube 13 so that the tube is completely closed off from the interior of the float cage 10. The under side of the member 56 is provided with a longitudinally extending groove 61. The groove 61 is V-shaped in transverse cross section and the extreme upper wall of the groove, that is the apex of the V, is coincident with the longitudinal axis of the tube 13. The member 56 secured on the end of the torque tube 13 projects into the opening 37 of the arm 29.

The part 57 on the float lever 12 is a hook or clamp element engaging with the member 56 to operatively connect the lever 12 and tube 13. As best illustrated in Fig. 4 of the drawings the part 57 has a boss 62 on its outer side provided with a threaded opening 63 and has spaced fingers 64 on its inner side. The opening 63 passes transversely through the part 57 and the reduced portion 48 of the float lever 12 is threaded into the opening 63. A lock nut 65 on the threaded lever portion 48 sets or locks the part 57 with respect to the lever 12. The fingers 64 are in the nature of clamps or hooks being shaped to engage over and conform to the above described bearing member 56. The part 57 has a flat inner face for conforming to one side of the polygonal member 56. The lower sides of the fingers 64 are flat to fit against the top face of the member 56 and tongues or downwardly projecting lugs 66 are provided on the ends of the fingers to engage with the outer side of the member 56.

Means is provided whereby connection of the float lever 12 with the part 57 serves to rigidly clamp the part 57 on the member 56. This means includes a tapered socket 67 in the side of the member 56 and a pilot or reduced stem 68 on the inner end of the lever 12. The end of the stem 68 is tapered to conform to the socket 67. The central axis of the socket 67 is coincident with the apex of the V groove 61 and the longitudinal axis of the torque tube 13. When the threaded portion 48 of the lever 12 is threaded through the opening 63, the tapered end of the stem 68 engages in the socket 67. This results in the member 56 being tightly clamped in the clamp part 57. The lock nut 65 serves to set or lock the parts in this clamped engagement.

The bearing means 14 further includes a bracket, or support 69 mounted in the cage 10. The support 69 has a cylindrical base seated in the counter bore 38 and is fixed to the arm 29 by screws 70. The bracket 69 has a lower boss or projection 71 extending under the member 56. An opening 72 extends vertically through the projection 71 and has a threaded counter bored lower part. The opening 72 serves to carry or receive the bearing 58. The bearing 58 is a cylindrical pin-like part engaged in the opening 72 and extending upwardly beyond the projection 71. The projecting upper portion of the bearing 58 is designed to cooperate with the V groove 61 of the member 56 to support the inner end of the torque tube 13. The upper end portion of the bearing 58 is wedge shaped or V shaped in cross section to present a knife edge 73. The knife edge 73 engages in or cooperates with the apex of the V groove 61. The angle of the surfaces forming the knife edge 73 is considerably less than the angle between the walls of the groove 61 so that the member 56 and tube 13 may have substantial turning movement. The knife edge 73 engaged in the V groove 61 pivotally or turnably supports the inner end of the torque tube 13 with a minimum of friction. Means is provided for removably retaining the knife edge bearing 58. This means includes threads 74 in the counter bored lower portion of the opening 72 and on the lower portion of the bearing 58. The bearing bracket 69 may have an upper projection 76 extending inwardly to be received between the fingers 64 with substantial clearance. The projection 76 extends over the member 56 and may operate as a stop to prevent disengagement of the member from the knife edge bearing 58.

The shaft 15 is provided to connect the inner end of the torque tube 13 with the pilot valve, control valve, indicator, or other operated device at the exterior of the cage 10. The shaft 15 extends longitudinally through the tube 13 and the opening 105 with substantial clearance. The inner end of the shaft 15 is fixed in an opening 77 in the stem 59 and member 56 so that the inner end of the shaft is rigid with the member and the inner end of the torque tube 13. The plug 103 has an opening 107 for freely passing the shaft 15. In the preferred construction the shaft 15 passes freely through the opening 107 and continues on through an opening 108 in the plate 92. In this connection it will be observed that the interior of the tube 13 and the openings 107 and 108 are sealed from and completely out of communication with the interior of the cage 10 so that there is no need to pack or seal about the shaft 15. Further, it is to be understood that the shaft 15 is rigid or substantially unyielding to directly transmit the turning motion from the inner end of the tube 13 and the parts connected therewith to the pilot mechanism.

It is preferred to provide an outboard bearing 109 for the shaft 15. In the structure illustrated in the drawings a suitable ball bearing 109 is arranged in a socket in the outer portion of the opening 108 to support the outer portion of the shaft 15. It is to be noted that the bearing 80 effectively supports the shaft 15 adjacent to the point where the shaft operatively connects with the pilot mechanism 93. A dust seal 110 may be provided in the outer part of the opening 108 to prevent passage of dust around the shaft 15.

The dust seal 110 is not essential. It is important to note that the cooperation of the boss 80 with the socket holds the mechanism 93 in position where the bearing 109 is aligned with the shaft 15 and maintains this alignment at all times.

In the construction illustrated in Fig. 5 the outer portion of the torque tube 13 is received in a counter bore in the opening 54 of the fitting 42. The fitting 42 is fixed or anchored to the outer end of the arm 29 and the torque tube 13 is in turn fixed to the fitting. Welding 55 fixes the torque tube 13 to the fixed fitting 42 and serves to seal around the tube to prevent the leakage of fluid from the cage 10 into the torque tube. The shaft 15 passing freely through the tube 13, as above described, continues outwardly through the opening 54 of the fitting 42. A bearing, such as a ball bearing, 80 is mounted in a socket 81 in the outer portion of the fitting 42 to support the shaft 15 adjacent to its point of connection with the pilot mechanism. A dust cap 82 is arranged in the socket 81 and carries fibrous material 83 for preventing the passage of dust, etc. around the shaft 15.

It is believed that the utility and practicability of the present invention will be readily understood from the foregoing detailed description. In operation variations in the level of the liquid in the main container with which the cage 10 is connected cause corresponding variations in the liquid level in the cage 10 and the float 11 will rise or fall. This movement of the float 11 produces swinging of the lever 12. Swinging of the lever 12 causes a turning force or torque to be applied to the inner end of the tube 13. The tube yields to this force and the shaft 15 is turned to control or operate the indicator, valve, or the like, at the exterior of the cage. It is important to note that the knife edge bearing 73 engaged in the V groove 61 dependably supports the inner portion of the tube 13 and the parts connected there with so that the tube is not distorted vertically or laterally. The support for the tube 13 provided by the knife edge bearing is accomplished by minimum of friction. Thus, there is a positive dependable frictionless bearing means for the inner portion of the yielding torque tube 13. The device is compact and is easy to assemble and install.

In the event it becomes necessary or desirable to inspect, clean, or repair the internal mechanism of the apparatus it is easy to gain full access to the mechanism. This is done by disconnecting the lever 12 from the float 11. A normally closed access opening 115 may be provided in the wall of the branch 26 to permit the ready disconnection of the float 11 from the lever 12. When this has been done the flange connection between the branch 26 and the arm 29 is disconnected by unthreading the nuts 32 from the studs 31. Following this, the arm 29 carrying the entire internal mechanism may be separated from the branch 26 and the mechanism is freely accessible for inspection, cleaning and repair.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A liquid level responsive device comprising a liquid containing housing, a float in the housing, a tube anchored to the wall of the housing to project therein, the tube being adapted to be flexed about its longitudinal axis, a lever for the float, means for connecting the lever with the tube so that operation of the lever flexes the tube, said means comprising a part on the tube, a clamp on the lever engaged on said part, and screw thread means for clamping the clamp on said part, said part having a V groove, a knife edge bearing in the housing received in said groove to support the inner portion of the tube, and a shaft secured to the inner portion of the tube to be turned upon flexure of the tube and extending outwardly through the tube.

2. A device of the character described comprising a liquid containing housing, a float in the housing, a tube anchored to the wall of the housing to project therein, the tube being adapted to be flexed about its longitudinal axis, a lever for the float, a member on the inner end of the tube having a downwardly facing recess, a hook clamp on the lever hooked over the member to connect the lever with the tube, an upstanding bearing part in the housing engaged in the recess to support the inner portion of the tube for flexure on its longitudinal axis, and a shaft secured to the inner portion of the tube to turn upon flexure of the tube and extending outwardly through the tube.

3. A device of the character described comprising a float cage, a float in the cage responsive to the liquid level therein, a torque tube anchored to the wall of the cage and closed against communication with the cage, a lever operated by the float, a bearing member on the inner end of the tube having a groove, a clamp having clamp fingers engaged on the member and having a threaded opening, a stem on the lever threaded in said opening to secure the lever to the member and cooperating with the member to clamp the clamp on the member, a shaft connected with the inner end of the tube and extending outwardly therethrough, and a bearing in the cage engaging in said groove to support the inner end of the tube.

GLENN F. BROCKETT.